(12) United States Patent
Hoogenstraaten et al.

(10) Patent No.: US 8,371,733 B2
(45) Date of Patent: Feb. 12, 2013

(54) DISPLAYING ARRANGEMENT WITH AMBIENT LIGHT

(75) Inventors: Willem Franciscus Johannes Hoogenstraaten, Eindhoven (NL); Cornelis Wilhelmus Kwisthout, Eindhoven (NL); Johannes Petrus Antonius Maria Van Asseldonk, Best (NL)

(73) Assignee: TP Vision Holding B.V., Eindhoven (NL)

( * ) Notice: Subject to any disclaimer, the term of this patent is extended or adjusted under 35 U.S.C. 154(b) by 400 days.

(21) Appl. No.: 12/521,782

(22) PCT Filed: Dec. 21, 2007

(86) PCT No.: PCT/IB2007/055285
§ 371 (c)(1),
(2), (4) Date: Jun. 30, 2009

(87) PCT Pub. No.: WO2008/081387
PCT Pub. Date: Jul. 10, 2008

(65) Prior Publication Data
US 2010/0026707 A1   Feb. 4, 2010

(30) Foreign Application Priority Data
Jan. 3, 2007   (EP) .................................... 07100043

(51) Int. Cl.
*F21V 7/04*   (2006.01)

(52) U.S. Cl. .................... 362/601; 362/97.1; 348/578
(58) Field of Classification Search ................ 362/601, 362/97.1; 348/578
See application file for complete search history.

(56) References Cited

U.S. PATENT DOCUMENTS

| 2,779,938 A | 1/1957 | Pifer |
| 2004/0227869 A1 | 11/2004 | Martynov et al. |
| 2007/0247851 A1* | 10/2007 | Villard .......................... 362/294 |

FOREIGN PATENT DOCUMENTS

| EP | 1551178 A1 | 7/2005 |
| JP | 2006337617 A | 12/2006 |
| WO | 2006003602 A1 | 1/2006 |

* cited by examiner

*Primary Examiner* — Evan Dzierzynski
(74) *Attorney, Agent, or Firm* — Shimokaji & Assoc., PC

(57) ABSTRACT

Disclosed are further improvements of AmbiLight Displaying Arrangement, a lighting or illumination system that has been introduced to enhance viewing experience. This is achieved by providing light sources (20) that create multiple colors next to at least one side of the screen (10) of the display device or arrangement, each of the multiple colors being adapted to the video contents at a spatially corresponding region (50) of the screen (10). In one embodiment the lighting or illumination system can have an improved construction wherein a reflector (60) has a window section (65) enabling the light from the light sources (20) to be split into two. Half or more of the light is directed to the background (30) of the display device and half or less of the light is directed to the bezel diffuser (70), i.e. to the front of the display device.

9 Claims, 4 Drawing Sheets

DISPLAYING ARRANGEMENT WITH AMBIENT LIGHT

FIELD OF THE INVENTION

In the recent past, the company Philips introduced AmbiLight TV, a television receiver display screen provided with rear light sources to illuminate the wall behind the TV. By automatically controlling the color of the light to match the color of the video image, AmbiLight offered a more immersive viewing experience to the viewer. An initial version of AmbiLight TV provided illumination of the left and right side with one color per side. Later generations were fitted with top and bottom light sources, but still with one color per side.

BACKGROUND OF THE INVENTION

The AmbiLight solutions introduced by the company Philips in the recent past have enjoyed an enormous success around the world. However, due to the tremendous and increasing variety of viewer requirements, desires and demands, it is necessary to further develop the existing AmbiLight solutions and/or create new ones.

The present invention seeks to further satisfy the fastidious viewer.

OBJECT AND SUMMARY OF THE INVENTION

It may be seen as an object of the present invention to further enhance the viewing experience of a display device or television.

According to one aspect of the invention, this can be achieved by providing light sources that create multiple colors next to at least one side of the screen of the displaying arrangement or television, each of the multiple colors being adapted to the video contents at a spatially corresponding region of the screen. Herewith is achieved that the displayed video image is extended, so to say, by additional "pixels" in the space surrounding the screen. Preferably, the pixels are not individually noticeable but blend over in each other to ensure a smooth low resolution image around the main screen.

According to another aspect of the invention, this can be achieved by improving the bezel construction of the lighting or illumination system the lighting or illumination system can comprise a bezel with a reflector and a diffuser, wherein the reflector has a window section allowing the light from the light sources to be split into two. Part, e.g. half or more, of the light can be directed to the background of the display device and another part, e.g. half or less of the light can be directed to the bezel diffuser, thus illuminating the front of the bezel.

In one possible embodiment, the light sources illuminate the background of the displaying arrangement or TV, such as a wall. Such an embodiment will be referred to as Pixelated AmbiLight. In another possible embodiment, the light sources are arranged in substantially the same planar area as the screen of the display device or TV, and radiate light to the front. Such an embodiment is will be referred to as Aura TV. Both embodiments may be combined to obtain an overwhelming effect.

The main features of the present invention are described in the independent claims.

Additional features of the invention are presented in the dependent claims.

In general by writing that "it is an advantage" by the present invention and referring to an advantage, it must be understood that this advantage may be seen as a possible advantage provided by the invention, but it may also be understood that the invention is particularly, but not exclusively, advantageous for obtaining the described advantage.

In general the various objects, aspects and advantages of the invention may be combined and coupled in any way possible within the scope of the invention.

These and other objects, aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
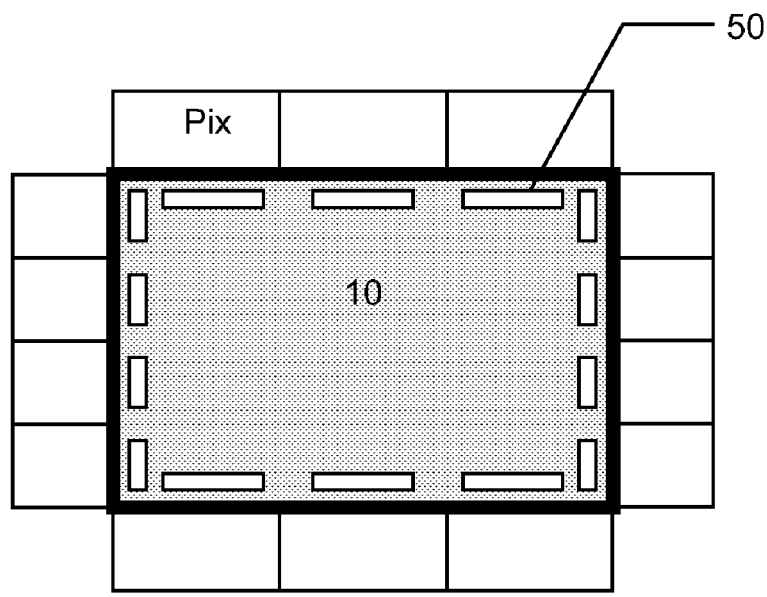
FIG. 1 shows a pixel resolution with 4 pixels for the left and right side and 3 pixels at top and bottom side.

The invention relates to a lighting or illumination system for a displaying arrangement or display device comprising a screen 10, being a LCD, plasma or any other panel, or any other image rendering surface, such as a projected image. The lighting or illumination system is arranged around the screen 10 in a number of light sources 20 placed in such a configuration that the light that they project on the wall 30 creates individual spots 40, Pix, Pix 1-Pix n when switched on one at the time. If however all light sources 20 are switched on at the same time, with the same color for all light sources, no individual spot should be identifiable.

A light spot or pixel 40, Pix, Pix 1-Pix n can be created by one or more light sources 20, such as for example LEDs. These light sources 20 shall be controlled by the same control signal, the pixel information. This pixel information contains three brightness values for Red R, Green G and Blue B, but not limited to that in case of another color primary system.

The pixel information is derived from the matching part of the screen 10 neighboring the projected pixel. This area 50 (also called as "video measurement area") can normally, but not necessary, be a rectangular area in which the video will be analyzed. The analysis can be done in various ways, depending on the desired effect.

As already mentioned, the resolution should not be so high that features of objects on the screen 10 are recognizable on the projected image on the wall 30.

A pixel resolution with a very good effect can be achieved by four pixels Pix for the left and right side and two or three pixels Pix at top and bottom side. This example is shown in FIG. 1.

The reason to have this pixel distribution is because human sight is horizontally oriented. We have a much wider horizontal viewing angle than vertical. In our natural sight we are also more used to horizontal features, like horizons compared to vertical features that are almost always associated with poles.

Therefore a horizontal extension of for instance a ball is less disturbing than creating a vertical extension of the same object. Preventing unnatural vertical structures can be done by enlarging the measurement area and reducing the number of pixels for the top and bottom sections.

One side effect of this solution can be that motion in top and bottom is not very smooth, a moving object jumps from one pixel to the other.

Figure 2:
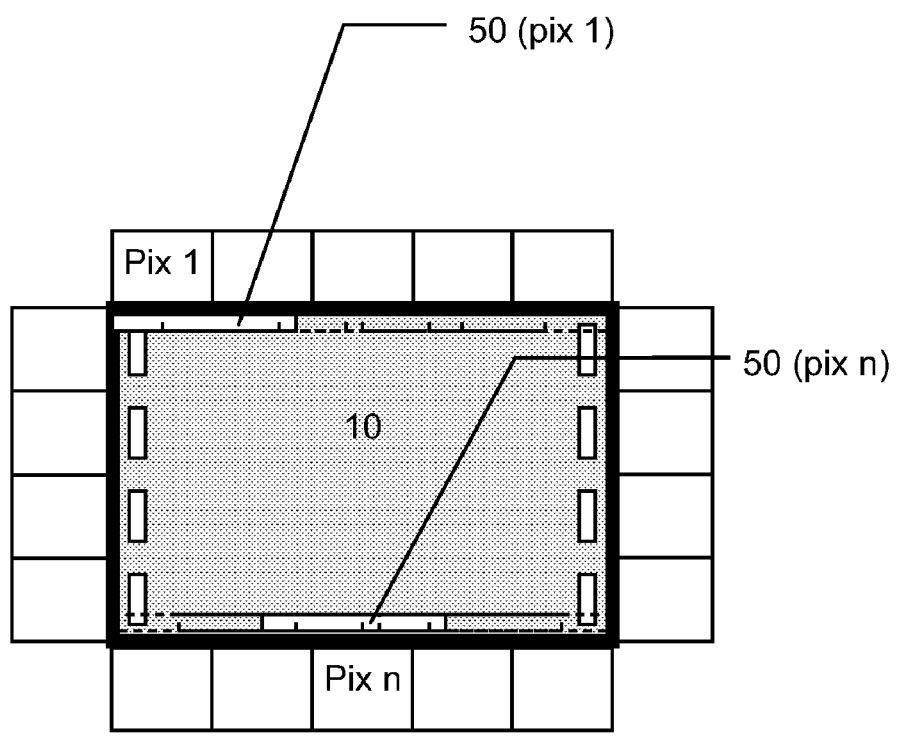
FIG. 2 illustrates another solution for a pixel resolution with several, highly overlapping measurement areas at top and bottom side.

A solution for this is to maintain the same pixel size for the left and right sides, but to maintain large measurement areas 50 for the top and bottom sides, which areas 50 have a high degree of overlap with each other. These large measurement areas 50 ensure that small objects don't create a vertical structure, but a global motion of larger objects becomes very smooth. This example is shown in FIG. 2.

Figure 3:
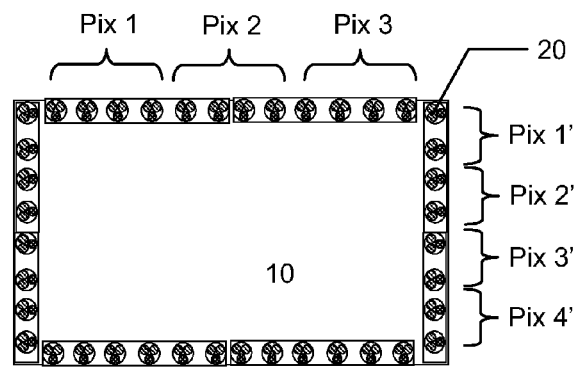
FIG. 3 shows yet another solution for a pixel resolution with 2 light sources per left and right pixel and 4 light sources per top and bottom pixel.

To acquire good pixel homogeneity, multiple light sources can be used to create one pixel. For example in case of a 42 inches screen 10, it is possible to have two light sources 20 (e.g. LEDs) per left and right pixel Pix 1'-Pix 4' and four light sources 20 (e.g. LEDs) per top and bottom pixel Pix 1-Pix 3. This example is shown in FIG. 3. Other embodiments with different numbers of light sources per pixel should also be possible.

Figure 4:
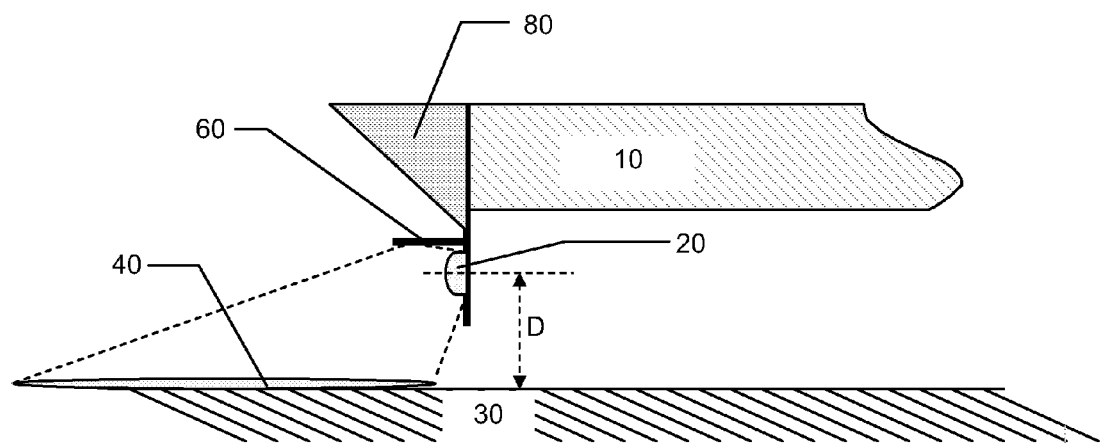
FIG. 4 shows a cross section of one embodiment of the lighting or illumination system.

The light sources 20 (for example LEDs) can be positioned in such a way to have the corners well lit by both the horizontally and vertically mounted light source 20 of the two adjacent pixels. To acquire homogenous global illumination on the background 30 of the display device, e.g. the wall, a certain distance "D" (shown in FIG. 4) would be necessary in order to allow the light to spread out evenly. In the embodiment shown in FIG. 4 the lighting or illumination system uses a mirror as a reflector 60 in order to direct the light towards the background 30 of the displaying arrangement, e.g. the wall. The basic solution comprises an array of Lambertian light sources 20 (for example LEDs).

Illumination of the screen edge or the bezel 80 can be advantageous in shops, where the effect of AmbiLight is largely deteriorated due to the bright illumination environment. This can result in pale colors around the screen. A self illuminating surface has in this case a much better visibility than an illuminated surface like a canvas or a wall on which light is projected. Besides that, the solution is not dependent of the presence or the color of a wall anymore. A second reason to illuminate the bezel of the displaying arrangement or display device is to bring the light effect closer to the screen 10, which is easier achieved when the bezel 80, being part of the overall construction, is also illuminated.

Figure 5:
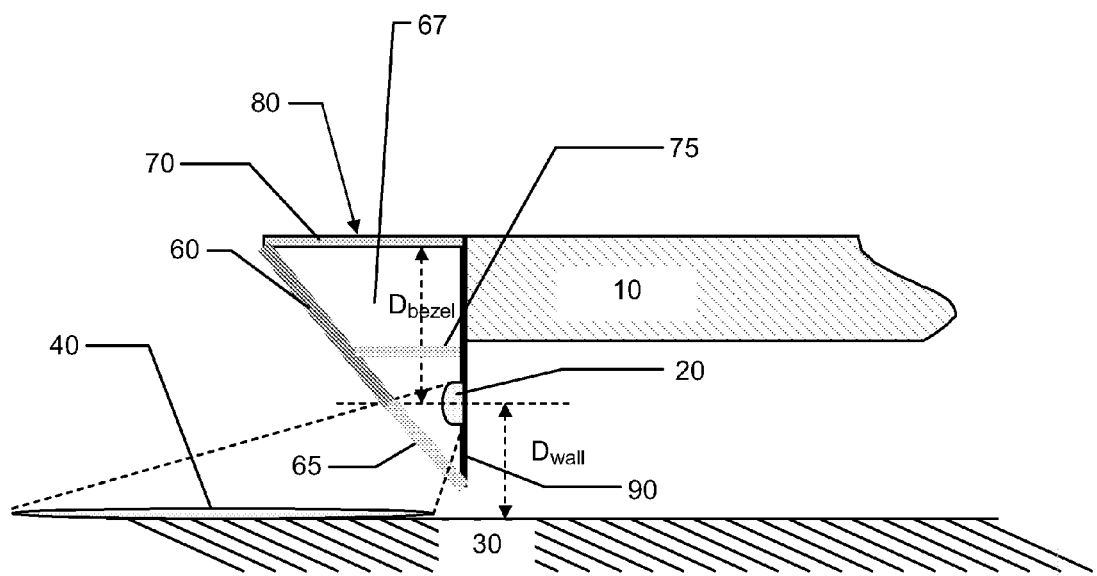
FIG. 5 illustrates a cross section of another embodiment of the bezel of the lighting or illumination system.

FIG. 5 shows a schematic diagram of a cross section of this possible embodiment. The light from the light sources 20 is now split into two. Part, e.g. half or more, of the light is directed to the background 30 of the display device, e.g. the wall (like Pixelated Ambilight), and another part, e.g. half or less, of the light is directed to a bezel diffuser 70 (like Aura TV), thus illuminating the front of the bezel 80. With respect to the "pixel" size and measurement areas, the same observations can apply as described above with reference to FIGS. 1-3.

To acquire homogenous global illumination on the wall 30 as well as on the bezel 80, a certain distance $D_{wall}$ and $D_{bezel}$ would be necessary in order to allow the light to spread out evenly. The basic solution comprises an array of Lambertian light sources 20 (for example LEDs). The light sources or the LEDs can be mounted on a vertically positioned cooling strip 90 which can be enclosed by a reflector 60 and a transparent diffuser 70 at the side of the screen 10, creating a light cavity 67.

The reflector 60 has a window section 65 that starts halfway at the light source 20 position. This window 65 allows the light to be radiated towards the background 30 of the displaying arrangement, e.g. the wall. Preferably the reflector 60 should be matt white and it should reflect the rest of the light to the transparent diffuser 70. The cooling strip 90 acts also as a diffuser to ensure a homogenous blending of the light from the different light sources 20.

The light sources 20 are mounted vertically (with reference to the diagram) to prevent undesired shading due to direct light from the light sources 20 projected on the transparent diffuser 70. Optionally the cooling strip 90 can be tilted backwards in such a way that no direct light from the light sources 20 can hit the transparent diffuser 70.

Optionally the transparent diffuser on the front of the display device can be made replaceable with a non-transparent diffuser so that the viewer will have the possibility to choose the light direction; e.g. radiating light only towards the background of the displaying arrangement or radiating light towards the background of the displaying arrangement and to the front. Another alternative is to have a non-transparent cover being able to be attached to the transparent diffuser by any suitable type of fastening means.

Optionally the window section 65 of the reflector 60 can be designed or adapted to be easily covered by a non-transparent cover arrangement so that the viewer will have the possibility to choose the light direction; e.g. radiating light only towards the front of the displaying arrangement or radiating light towards the background of the displaying arrangement and to the front.

Optionally a second diffuser 75 can be mounted in the light cavity 67 to ensure that no individual spots can be noticed at the front.

Figure 6:
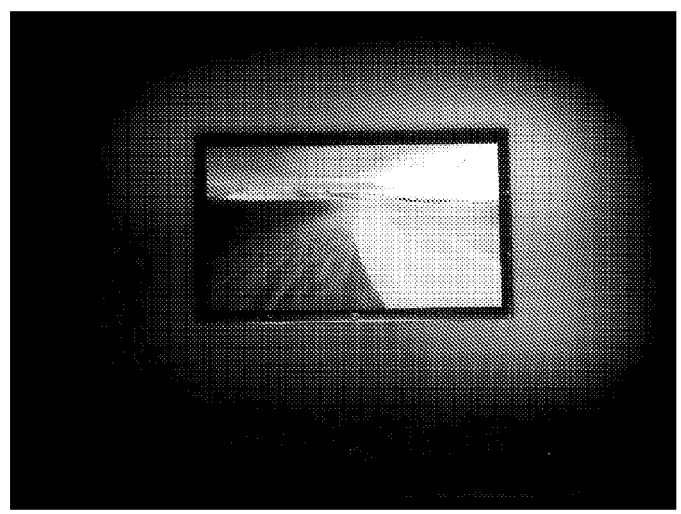
FIG. 6 shows an example of a Pixelated Ambilight system.

FIG. 6 shows a photographic example of a Pixelated Ambilight system. As will be appreciated, the creation of multiple colors per side, one color per pixel, produces a smooth low resolution image around the main screen on the wall. If properly configured, Pixelated AmbiLight can create sufficiently higher immersion than the "traditional" AmbiLight, with only one color per side.

Figure 7:
FIG. 7 shows an example of an Aura TV system.

It is also possible to illuminate the bezel in a similar way, either alone or in combination with background illumination. This creates an aura of more detail on the bezel around the screen extending the image on the bezel area and on the wall, thus creating an even greater level of immersion. FIG. 7 shows an example of such an Aura TV system.

The invention can be summarized as follows: Disclosed are further improvements of AmbiLight Displaying Arrangement, a lighting or illumination system that has been introduced to enhance viewing experience. This is achieved by providing light sources that create multiple colors next to a side of the screen of the display device or television, each of the multiple colors being adapted to the video contents at a spatially corresponding region of the screen. A high resolution video image is thus extended by additional low resolution "pixels" in the space surrounding the screen. In one possible embodiment, the light sources illuminate a background surface behind the TV, such as a wall. In another possible embodiments, the light sources are arranged around the display screen in substantially the same planar area, and radiate light to the front, either alone or in combination with background illumination. In yet another possible embodiment the lighting or illumination system can have an improved construction wherein the reflector has a window section enabling the light from the light sources to be split into two. Part, e.g. half or more, of the light is directed to the wall, and another part, e.g. half or less of the light is directed to the bezel diffuser, i.e. to the front of the displaying arrangement or display device.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second", etc. do not preclude a plurality. Reference signs are included in the claims, however the inclusion of the reference signs is only for clarity reasons and should not be construed as limiting the scope of the claims.

The invention claimed is:

1. A display device having a display screen (10) for displaying video image(s), and further comprising a lighting or illumination system with multiple light sources (20) for creating respective multiple colors next to at least one side of the display screen (10), each of the light sources (20) being controlled to produce colors matching the video contents at a spatially corresponding region (50) of the display screen (10); wherein the lighting or illumination system further comprises a bezel (80) with a reflector (60) and a diffuser (70), wherein the reflector (60) has a window section (65) allowing the light from the light sources (20) to be split into two in such a way that part, e.g. half or more, of the light is being directed to the background (30) of the display device and another part, e.g. half or less of the light is being directed to the bezel diffuser (70), thus illuminating the front of the bezel (80).

2. The device according to claim 1, wherein the window section (65) of the reflector (60) starts halfway at the light source (20) position.

3. The device according to claim 1, wherein the light sources (20) are arranged to radiate light in substantially the same direction as the display screen (10) and/or the light sources (20) are arranged to illuminate a surface (30) behind the display screen (10).

4. The device according to claim 1, wherein the light sources (20) are arranged in substantially the same planar area as the display screen (10).

5. The device according to claim 1, wherein the light sources (20) for each side of the screen (10) are mounted in a line on a cooling strip (90) to prevent undesired shading due to direct light from the light sources (20) radiated or projected towards the front of the display device.

6. The device according to claim 1, wherein a second diffuser (75) is mounted in the light cavity (67) defined by the reflector (60) and the first diffuser (70) to ensure that no individual spots can be noticed at the front.

7. A method of displaying video image(s), comprising the steps of: displaying video image(s) on a display screen (10), and providing lighting or illumination system with multiple light sources (20) for creating respective multiple colors next to at least one side of the display screen (10), each of the light sources (20) being controlled to produce colors matching the video contents at a spatially corresponding region (50) of the display screen (10); wherein the lighting or illumination system further comprises a bezel (80) with a reflector (60) and a diffuser (70), wherein the reflector (60) splits the light from the light sources into two by means of a window section (65) so that part, e.g. half or more, of the light is being directed to the background (30) of the display device and another part, e.g. half or less, of the light is being directed to the bezel diffuser (70), thus illuminating the front of the bezel (80).

8. A display device having a display screen (10) for displaying video image(s), and further comprising a lighting or illumination system with multiple light sources (20) for creating respective multiple colors next to at least one side of the display screen (10), each of the light sources (20) being controlled to produce colors matching the video contents at at least one of spatially corresponding regions (50) of the display screen (10); wherein (i) said regions for left and right sides of the display screen maintain a same size and (ii) said regions for top and bottom sides of the display screen maintain a large size, larger than the regions for the left and right sides of the display screen, and have a degree of overlap with each other so as to (ii)(a) prevent creation of unnatural vertical structures of small objects and (ii)(b) ensure a smooth global motion of large objects.

9. A method of displaying video image(s), comprising the steps of: displaying video image(s) on a display screen (10), and providing lighting or illumination system with multiple light sources (20) for creating respective multiple colors next to at least one side of the display screen (10), each of the light sources (20) being controlled to produce colors matching the video contents at at least one of spatially corresponding regions (50) of the display screen (10); wherein (i) said regions for left and right sides of the display screen maintain a same size and (ii) said regions for top and bottom sides of the display screen maintain a large size, larger than the regions for the left and right sides of the display screen, and have a degree of overlap with each other so as to (ii)(a) prevent creation of unnatural vertical structures of small objects and (ii)(b) ensure a smooth global motion of large objects.

* * * * *